US012272345B2

(12) United States Patent
Gu et al.

(10) Patent No.: US 12,272,345 B2
(45) Date of Patent: Apr. 8, 2025

(54) ACOUSTIC FENCE

(71) Applicant: Zoom Video Communications, Inc., San Jose, CA (US)

(72) Inventors: Zhenghang Gu, San Jose, CA (US); Zhaofeng Jia, Saratoga, CA (US); Qiyong Liu, Marina Bay (SG); Ye Wang, Hangzhou (CN); Zexian Wu, Hangzhou (CN); Chunyu Zhang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 180 days.

(21) Appl. No.: 17/898,218

(22) Filed: Aug. 29, 2022

(65) Prior Publication Data

US 2024/0071356 A1 Feb. 29, 2024

(51) Int. Cl.

| | |
|---|---|
| ***G10K 11/00*** | (2006.01) |
| ***G10K 11/175*** | (2006.01) |
| ***G10K 11/178*** | (2006.01) |
| ***H04R 3/00*** | (2006.01) |
| ***H04R 5/027*** | (2006.01) |
| ***H04S 3/00*** | (2006.01) |

(52) U.S. Cl.

CPC .... *G10K 11/17823* (2018.01); *G10K 11/1752* (2020.05); *G10K 11/17854* (2018.01); *G10K 11/17873* (2018.01); *H04R 3/005* (2013.01); *H04R 5/027* (2013.01); *H04S 3/008* (2013.01); *G10K 2210/108* (2013.01); *G10K 2210/3027* (2013.01); *G10K 2210/3028* (2013.01); *G10K 2210/3044* (2013.01); *H04S 2400/01* (2013.01)

(58) Field of Classification Search

CPC ....... G10K 11/17823; G10K 11/17873; G10K 11/17854; G10K 11/1752; G10K 2210/108; G10K 2210/3027; G10K 2210/3028; G10K 2210/3044; H04R 3/005; H04R 5/027; H04S 3/008; H04S 2400/01

USPC ...................... 381/1, 56, 58, 71.1, 94.1, 124

See application file for complete search history.

(56) References Cited

U.S. PATENT DOCUMENTS 11,483,646 B1 * 10/2022 Pan ........................ H04R 3/005
2023/0067132 A1 * 3/2023 Ochiai .................... G10L 25/93
2023/0086490 A1 * 3/2023 Abraham ................. H04R 5/04 381/26
2023/0104070 A1 * 4/2023 Liu ...................... H04R 25/405 381/92

* cited by examiner

*Primary Examiner* — William A Jerez Lora

(74) *Attorney, Agent, or Firm* — Kilpatrick Townsend & Stockton LLP

(57) ABSTRACT

For online audio/video conferencing applications deployed in an open office environment, using shared conference devices, it can be advantageous to define an acoustic fence. A non-participant audio received from outside the acoustic fence can be considered noise and filtered out before transmission of an audio signal to a far end recipient. Three suppression stages are used to filter the non-participant audio. The first suppression stage uses beamformers for suppression. The second suppression stage is mask-based, and the third suppression stage is reference-based. The three suppression stages filter out non-participant audio signals, having a wide range of frequencies.

20 Claims, 6 Drawing Sheets

ACOUSTIC FENCE

FIELD

This application relates to the field of online video conferencing and more particularly to audio capture and management in the online video conferencing environment.

SUMMARY

The appended claims may serve as a summary of this application.

DETAILED DESCRIPTION OF THE DRAWINGS

Figure 1:
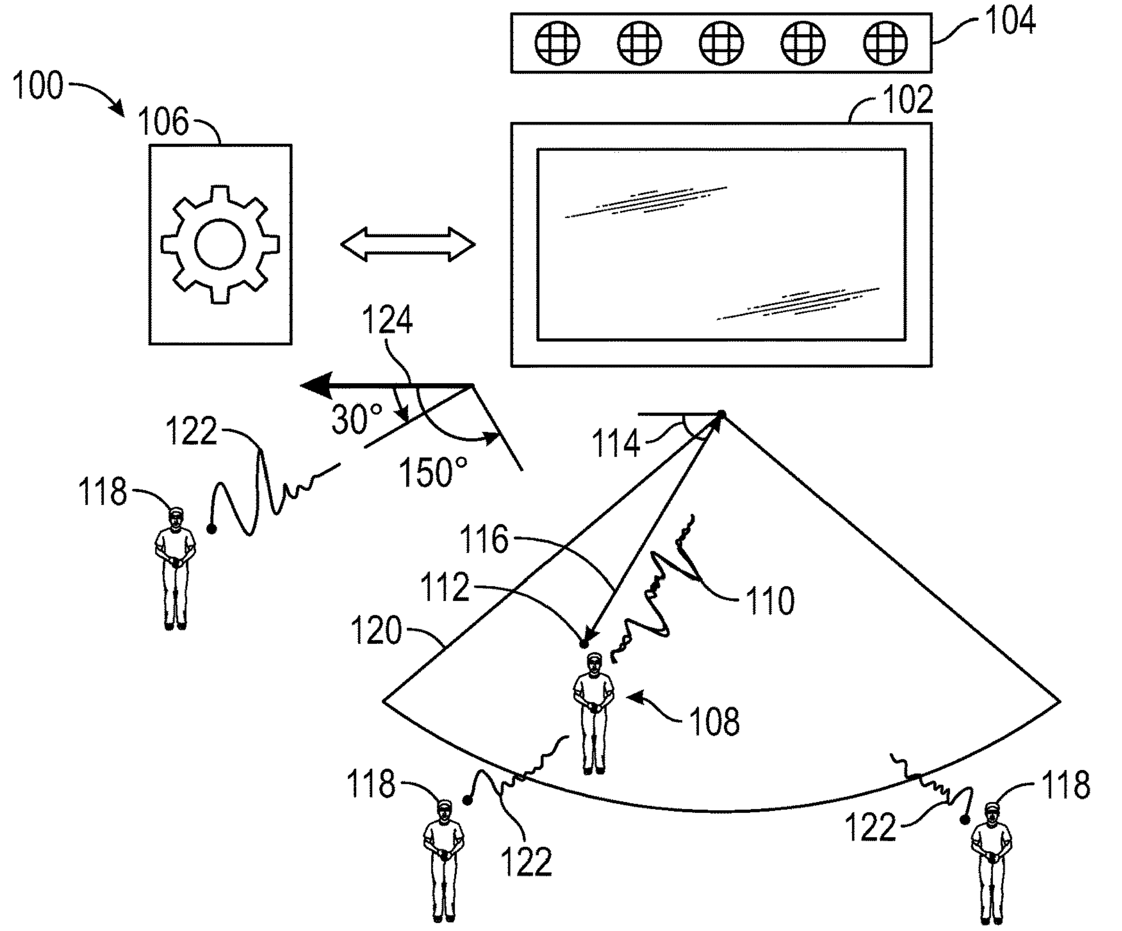
FIG. 1 illustrates a diagram of an environment of a conference device.

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Overview

Video conferencing over a computer network can be implemented where each participant uses his or her personal computing device, such as a laptop, tablet or smartphone to join the video conference. This approach has worked well, especially with the advent of remote work. With more workers returning to offices, businesses sometimes utilize conference room and open office environments, where employees may conduct business. These shared work environments and physical conference rooms can be equipped with robust video conferencing hardware that can provide more facilities to a group of people conducting an online video conference. Examples include conference devices that integrate a variety of functionality, related to online conferencing. For example, some conference devices can include cameras, microphones, displays and loudspeakers in an integrated fashion. These integrated conference devices can capture audio and video from the participants and transmit the captured audio and video to a far-end recipient. They usually include display and loudspeakers to be able to also display and playback video and audio received from the far-end recipients. Typically, information technology (IT) department employees can set up and monitor such conference devices.

In an open office environment or shared workspace, there might be employees who would like to conduct an online video conference using conference devices, while other employees present in the same room may be in conversation with other colleagues about topics unrelated to an ongoing audio/video conference in the same environment. In such scenarios, it would be beneficial to be able to define an acoustic fence with parameters, so a conference device would only transmit audio from participants within the acoustic fence and suppress audio received from the non-participants located outside the acoustic fence.

Acoustic Fence Generator Embodiments and Environments

FIG. 1 illustrates a diagram of an environment of a conference device 100. The conference device 100 can include a screen 102 and a multi-channel audio input device 104. In some embodiments, the multi-channel audio input device 104 can be an array of microphones. The conference device 100 can also include other components to facilitate receipt and transmission of an audio/video conference signal. Other components of the conference device 100 can include a camera, loudspeaker, processor components, volatile and permanent memory modules, and other components. In some embodiments, the conference device 100 can also include a conference device application 106, which can be used to provide settings and configuration parameters for the conference device 100.

A conference device 100, equipped with a multi-channel audio input device 104 (MCAI device 104) and an acoustic fence generator can detect an angle and a distance of the source of an audio signal captured by the MCAI device 104. For example, a user 108 produces the audio signal 110. The audio signal 110 arrives at each microphone in the microphone array of the MCAI device 104 at varying times. The audio waves captured by each microphone can include varying phases. The phase, time of arrival and distance between each microphone in the microphone array can be used to determine an angle 114 and a distance 116 between the source 112 of the audio signal 110 and the MCAI device 104.

The described embodiments can be used to establish an acoustic fence 120. The acoustic fence 120 can be established in terms of parameters such as angles 114 and distances 116. The conference device 100 can capture audio signals from both inside and outside the acoustic fence 120. The conference device 100 can suppress audio signals 122 having sources 118 outside of the acoustic fence 120. The audio signals 110 having sources 112 inside the acoustic fence 120 can be enhanced. After this processing, the conference device 100 transmits the audio signals 110 originating from inside the acoustic fence 120 to the far-end recipients. In this manner, the conference device 102 can suppress audio from non-participant speakers outside the acoustic fence 120 from transmission to a far end recipient.

The parameters of the acoustic fence 120 can be set up via the conference device application 106. In some embodiments, the acoustic fence 120 can be set up to correspond to the field of view (FOV) of a camera of the conference device 102. In this manner, audio signals 110 coming from any user 108 within the FOV of the camera of the conference device 100 can be captured and transmitted, while audio signals 122 from persons outside the acoustic fence 120 can be suppressed. In some applications, the IT personnel may be well-positioned to set up the acoustic fence parameters by knowing the layout of the physical room where the conference device 100 is located. For example, if the layout of the environment of the conference device 100 can include seating at certain angles and distances from the MCAI device 104, those angles and distances can be used to program an acoustic fence to include all potential participants. Alternatively, or in addition, if the IT personnel is aware of a source of noise in a conference room where the conference device 100 is located, the IT personnel can program the acoustic fence to exclude the audio signals coming from the noisy area.

In some embodiments, the conference device application 106 can include user interface (UI) elements to enable acoustic fence functionality (e.g., via a slider, button or similar UI elements) and to input parameters of the acoustic fence 120, such as angle and distance. These parameters can be received via one or more UI elements and translated into various thresholds to be used in an acoustic fence generator. For example, an acoustic fence 120 can include an area within 30 to 150 degrees from a reference orientation 124 along the longer dimension of a rectangular conference device 100, and a distance of up to 10 feet from the center of the rectangular conference device 100. In other words, audio signals originating from a distance of below 10 feet and having an angle between 30 to 150 degrees would be transmitted and audio signals coming from outside this region would be suppressed.

Figure 2:
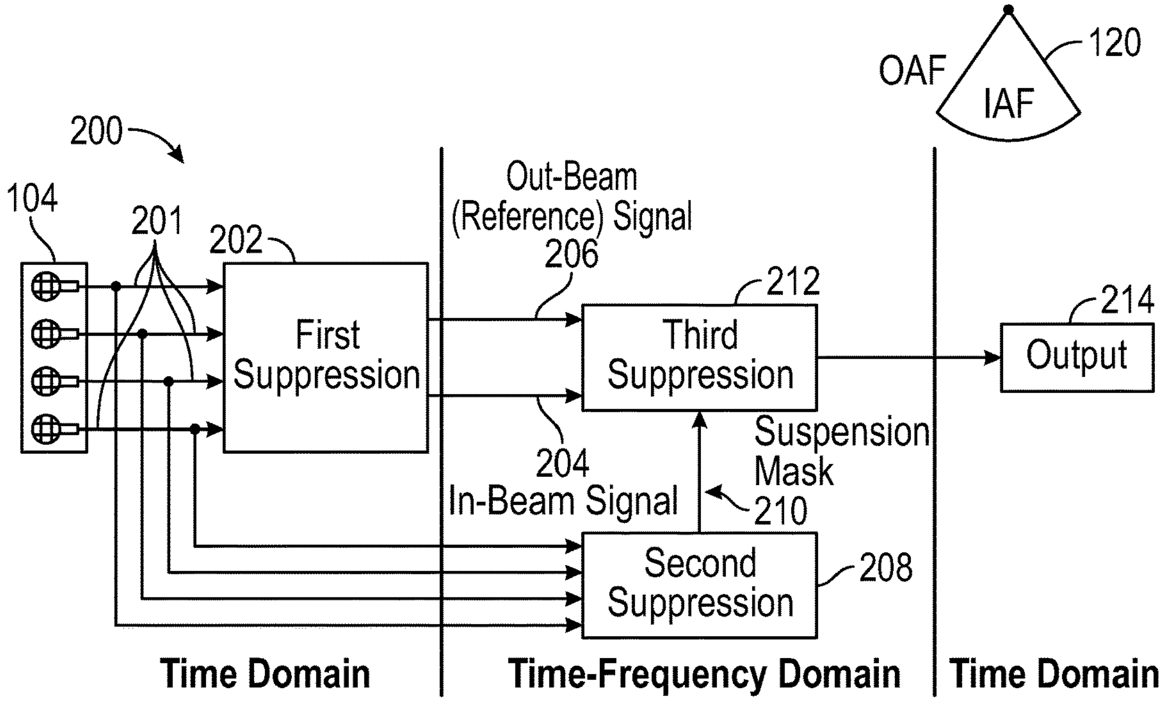
FIG. 2 illustrates a diagram of an acoustic fence generator.

FIG. 2 illustrates a diagram of an acoustic fence generator (AFG) 200. The AFG 200 can be implemented in the conference device application 106. The AFG 200 can be configured by receiving parameters of an acoustic fence 120 via one or more UI elements in the conference device application 106 or from a default selection of parameters. These parameters can include angle and/or distance data. The AFG 200 utilizes three audio suppression stages to reduce or minimize audio signals originated outside the area defined by the acoustic fence 120. One or more suppression stages of the AFG 200 can also include noise suppression to suppress noise in addition to suppressing signals from outside the acoustic fence area. While not shown, the AFG 200 can also include voice activity detectors (VADs), where in some embodiments, acoustic fence generation algorithms operate on the voice segments of the received audio signals. The first suppression stage 202 applies a first suppression to the audio signals 201 received from the MCAI device 104. The first suppression stage 202 can include two time-domain filter and sum beamformers configured to generate an in-beam signal 204 and a reference signal 206. The in-beam signal 204 includes audio signals 201 from the MCAI device 104 with out-of-the-acoustic-fence (OAF) audio signals suppressed. The first suppression stage also generates a reference signal 206 by reducing and minimizing the in-the-acoustic-fence (IAF) audio signals and enhancing the out-of-the-acoustic-fence (OAF) audio signals. The low frequency components of the reference signal 206 are used, in a third suppression stage 212 to further suppress the residual OAF signals after processing the in-beam signal 204 in the first and second suppression stages.

The audio signals received from the MCAI device 104 are also processed by a second suppression stage 208. The second suppression stage 208 generates a suppression mask 210, based on detecting the angle and distance of the audio signals 201. The second suppression stage 208 uses the detected angle and/or distance data in relation to the acoustic fence parameters to generate a suppression mask 210. The suppression mask 210 then applied to the in-beam signal 204 further suppresses the OAF audio signals. The first and second suppression stages detect and reduce or minimize the OAF audio signals. Some low frequency components of OAF audio signals are not detected and/or suppressed by the first and second suppression stages. For these OAF audio signals, the AFG 200 can utilize a third suppression stage 212.

The third suppression stage 212 includes a reference-based suppression stage, which uses the reference signal 206 to detect and suppress low frequency components of the OAF audio signals. In other words, the third suppression stage 212 reduces or minimizes the residual low frequency components OAF audio signals that may not have been detected and/or suppressed by the first and second suppression stages 202 and 208. In some embodiments, the third-suppression stage 212 generates a reference-based mask based on the reference signal 206. The reference-based mask can include multipliers that suppress the low frequency components of the audio signals indicated by the reference signal 206.

In some embodiments, the third suppression stage 206 combines the reference-based mask with the suppression mask received from the second suppression stage 208 and applies the combined mask to the in-beam signal 204. In other words, the combined mask includes multipliers from both the suppression mask 210 and the reference-based mask. The combined mask, therefore, can suppress OAF audio signals, by applying multipliers from the suppression mask 210, provided by the second suppression stage 208. The combined mask can use the low frequency components of the OAF signals provided by the reference signal 206 to suppress these components. The suppression can be accomplished by applying a mask or by integration in a noise suppression module, by treating these components as noise in such a noise suppression module. Therefore, in some embodiments, the masks generated by the third suppression stage 212 can also include multipliers based on an estimated noise signal in the audio signals 201 to reduce or minimize noise signals, in addition to suppressing the OAF audio signals. The output 214 of the third suppression stage 212 includes IAF audio signals with suppressed OAF audio signals. The output 214 can be transmitted to the far-end recipients of an audio/video conference.

Figure 3:
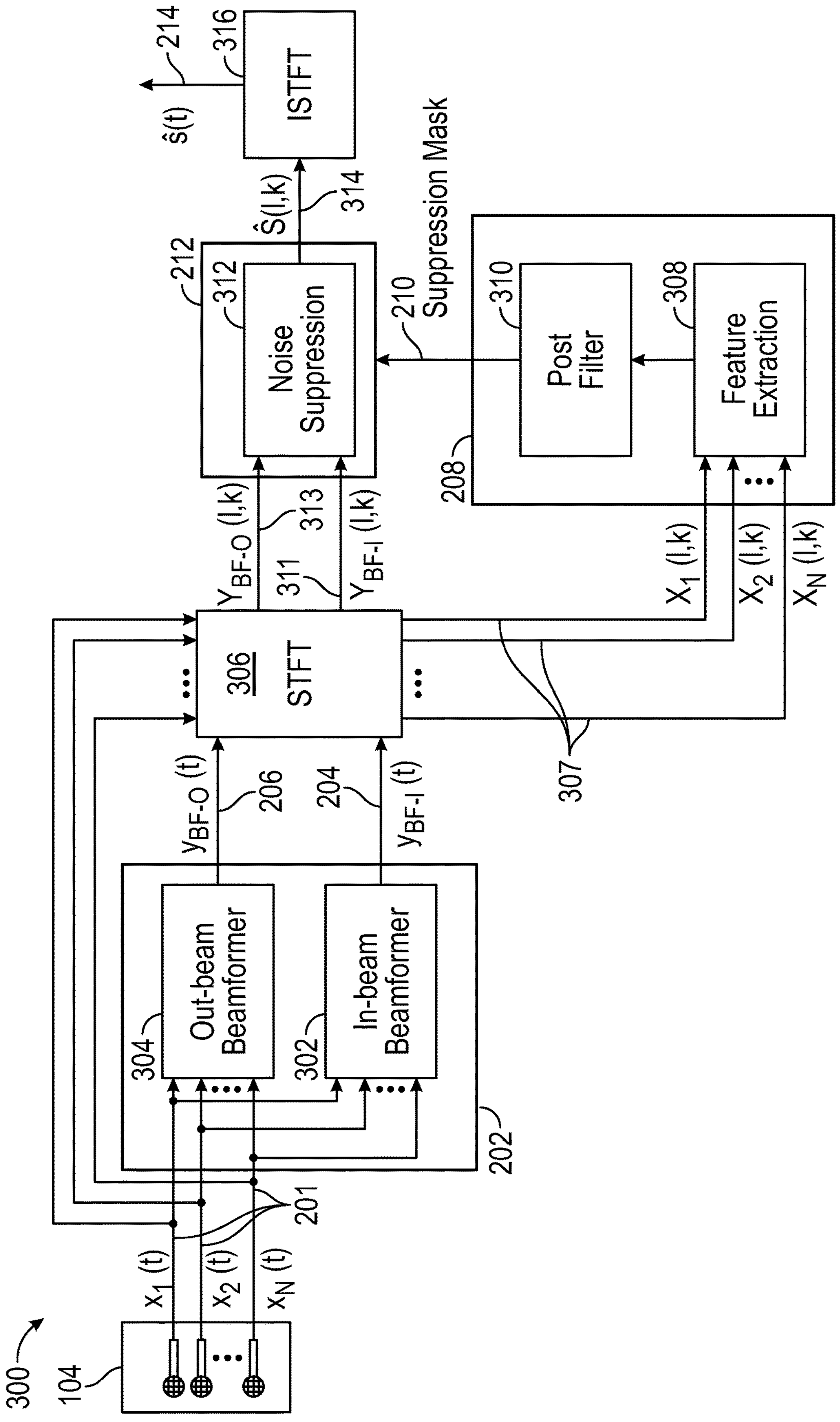
FIG. 3 illustrates a second diagram of an acoustic fence generator.

FIG. 3 is a block diagram of an example acoustic fence generator (AFG) 300. The AFG 300 is similar to the AFG 200 and uses three suppression stages. The AFG 300 receives audio signals 201, such as $x_1(t)$, $x_2(t)$, . . . , $x_N(t)$ from the MCAI device 104. In some embodiments, the first suppression stage 202 performs a linear suppression and uses two time-domain filter and sum beamformers as a suppression method. The first suppression stage 202 includes modules which generate an in-beam beamformer 302 and an out-beam beamformer 304. In some embodiments, the in-beam and out-beam beamformers are generated with constant bandwidth frequency invariant beamformers with filter coefficients win and wont, respectively. The in-beam beamformer 302 is generated to point toward the interior of the acoustic fence 120. The out-beam beamformer 304 is generated to point toward the exterior of the acoustic fence 120, which can be termed the interference region, where OAF audio signals are originated.

Both beamformers 302, 304 handle the suppression of the OAF audio signals with respect to the parameter of angle of the acoustic fence 120. The suppression of the OAF audio signals, directed to the distance parameter of the acoustic fence 120 is performed by the operations of the second suppression stage 208. The in-beam beamformer 302 enhances IAF audio signals and suppresses the OAF audio signals in the audio signals 201 and generates the in-beam signal 204, $y_{BF-I}(t)$, where BF stands for beamformer, and "I" stands for "in-beam". The in-beam signal will be further processed and be the basis of the output signal of the AFG 300. The out-beam beamformer 304 performs the inverse operation of the in-beam beamformer 302 by enhancing the OAF audio signals, suppressing the IAF audio signals and generating the reference signal, 206, $y_{BF-O}(t)$, where BF stands for beamformer, and "0" stands for "out-beam". The operations of the first suppression stage 202 are linear spatial filtering and are performed in time domain. For example, the phase portion of the audio signals 201 can be used for determining which audio signals are IAF and which audio signals are OAF.

Figure 4:
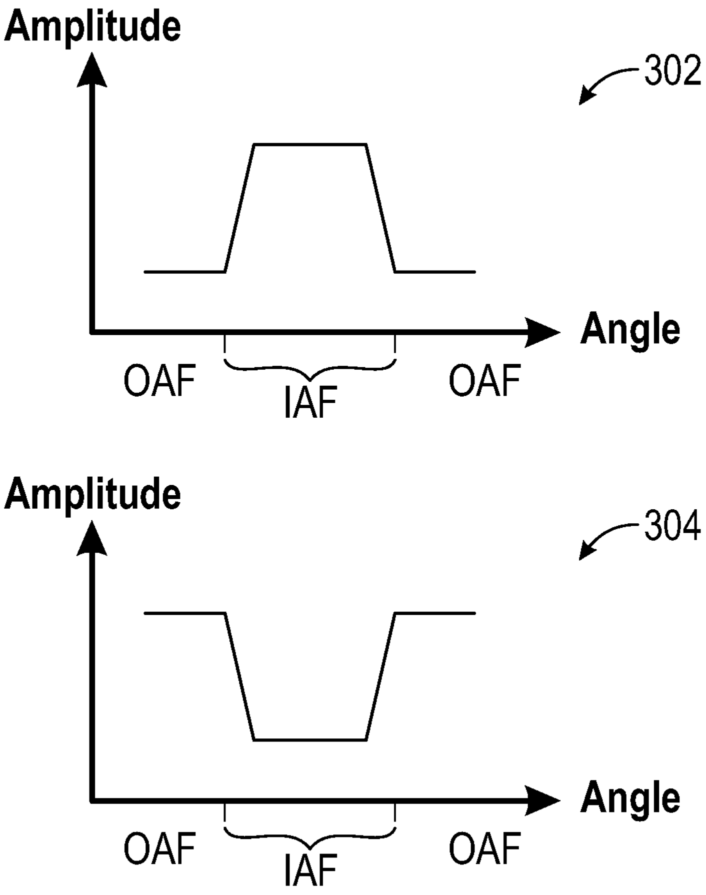
FIG. 4 illustrates the relationship between the in-beam and the out-beam beamformers.

FIG. 4 illustrates the inverse relationship between the in-beam beamformer 302 and the out-beam beamformer 304. The beamformers are plotted to show angle on the horizontal axis and amplitude on the vertical axis. The in-beam beamformer 302 suppresses the audio signals from the OAF region, while enhancing the audio signals in the IAF region. The out-beam beamformer 304, plotted on the same axes (angle on the horizontal axis and amplitude on the vertical axis), is the inverse of the in-beam beamformer 302, where it enhances the audio signals originating from the OAF region and suppresses the audio signals originating from the IAF region.

Referring back to FIG. 3, in some embodiments, the in-beam signal 204, the reference signal 206 and the audio signals 201 are processed through a Fourier transform module, such as a short time Fourier transform (STFT) module 306 to generate these signals in time-frequency domain for the downstream processes in the AFG 300. The audio signals 201 ($x_1(t)$, $x_2(t)$, . . . , $x_N(t)$) are transformed to time-frequency domain signals 307 ($X_1(l,k)$, $X_2(l,k)$, . . . $X_N(l,k)$). The transformed audio signals 307 are used for feature extraction in the second suppression stage 208. The second suppression stage 208 is a non-linear mask-based suppression module. The second suppression stage 208 also uses spatial features, such as the phase portion of an audio wave to detect IAF and OAF audio signals. The transformed signals 307 are processed through a feature extraction module 308, where the angle and/or distance of an audio signal 201 are detected. The feature extraction module can utilize a variety of techniques to detect the angle and/or distance of an audio signal. Example techniques include, using the phase-differences of audio signals 201 received by the different microphone devices in a microphone array of the MCAI device 104 with a direction of arrival (DOA) technique to determine an angle of the source of an audio signal 201 relative to the MCAI device 104. Distance of an origin of an audio signal to the MCAI device 104 can be detected by using a generalized cross correlation phase transform (GCC-PHAT) or Steered-Response Power Phase Transform (SRP-PHAT) based localization technique. In some embodiments, feature extraction module 308 operates on the voice segment of an audio signal 201. In those embodiments, the feature extraction module 308 can include a voice activity detector (VAD) as an internal or as a pre-processing module.

The second suppression stage 208 can include a post-filter module 310. The post-filter module 310 can use the output of the feature extraction module 308 and the parameters of the acoustic fence 120 to construct the suppression mask 210. The post-filter 310 can construct the suppression mask 210 with a variety of techniques depending on the design and implementation of the AFG 300. In one example, the suppression mask 210 is a data structure of a combination of thresholds and a corresponding multiplier.

In some embodiments, the suppression mask 210 can be a soft mask, based on detection and selected threshold values. A soft mask can utilize a flexible range of values. A hard mask can have binary values of 0s and 1s, while a soft mask can include a range of values between 0 and 1. In some embodiments, the data from the suppression mask 210 can be integrated in a noise suppression module, for example, in the third suppression stage 212, where the OAF audio signals are marked as noise and the IAF audio signals are marked as target. A Wiener filter or similar noise suppression method can be used to obtain the combined mask.

The degrees of certainty of the source of an audio signal can be dictated by the thresholds derived from the acoustic fence parameters. For example, if the acoustic fence is defined with angles between 30 to 150 degrees and distances of less than 10 feet, then a signal detected to be from a source at a distance of 6 feet at a 45-degree angle relative to the MCAI device 104 is an IAF audio signal with a high degree of certainty and can receive a multiplier of "1" in the suppression mask 210. In the audio fence 120 having parameters of angle 30-150 degrees and 10 feet distance, an audio signal detected to be from a source 12 feet away and at an angle of 15 degrees is confidently from the OAF region and can receive a multiplier of "0" in the suppression mask 210. In the same acoustic fence, an audio signal detected to be from a source at a distance of 10 feet and an angle of 30 degrees is a border audio signal and can receive a conservative multiplier of 0.5 or 0.6 in the suppression mask 210. The second suppression stage 208 provides the suppression mask 210 to the third suppression stage 212.

The operations of the first and second suppression stages 202 and 208 are effective in reducing or eliminating most OAF audio signals, but for some low frequency components of the audio signals, the operations of the first and second suppression stages, alone, may not be adequate to detect and reduce or minimize residual low frequency components of the OAF audio signals present in the in-beam signal 204.

Referring to FIG. 3, the third suppression stage 212 can also include a noise suppression module 312. In some embodiments, the noise suppression module 312 can use a variety of techniques to detect and estimate the noise signal in the audio signals 201 and eliminate or reduce the noise signal, as well as eliminate or reduce the OAF audio signals. Various embodiments of the third suppression stage 312 can include receiving the suppression mask 210 from the second suppression stage 208 and combining the suppression mask 210 with one or more additional masks to eliminate the residual OAF audio signals, including the OAF low frequency audio signal components, as well as noise signals.

The third suppression stage 212, in one respect, can include, a reference-based mask, operating in the time-frequency domain. The in-beam signal 204 and the reference signal 206 are transformed with a Fourier transform module, for example, with the STFT module 306 to generate a transformed in-beam signal 311, $Y_{BF-I}(l,k)$ and a transformed reference signal 313, $Y_{BF-O}(l,k)$. In one embodiment, the noise suppression module 312 operates on the transformed in-beam signal 311, the transformed reference signal 313, and the suppression mask 210, as input, to perform both noise suppression and reduction or elimination of residual low frequency components of the OAF audio signals.

The operations of the noise suppression module 312 can be modified or augmented to apply two or more combined suppression masks. Each mask can be a data structure of multipliers that when applied to the signal 311, selectively suppress, enhance or leave-unchanged the transformed in-beam signal 311, based on the value of the multipliers. For example, a multiplier of "1" would leave the transformed in-beam signal 311 unchanged, a multiplier "0" would aggressively suppress the transformed in-beam signal 311, and a multiplier 0.5 or 0.6 in the portion applied would moderately suppress the transformed in-beam signal 311. The particulars of the values of multipliers of the mask can depend on implementation and the environment of the AFG 300. The combined masks can include a reference-based mask generated from the transformed reference signal 313, a mask generated from an estimated noise signal, and the suppression mask 210 received from the second suppression stage 208. Each mask can contribute a series of multipliers to the combined mask. Therefore, when the combined mask is applied to the transformed in-beam signal 311, the time-frequency components corresponding to each mask will be suppressed, left unchanged or enhanced according to the multipliers in that mask. In this manner, the combined mask selectively suppresses, enhances or leaves unchanged a wide range of frequencies. The suppression mask 210 from the second suppression stage provides multipliers for medium or high frequency OAF audio signals, the reference-based mask provides multipliers for the low frequency components of OAF audio signals and an estimated noise signal can provide multipliers for the noise signal in the audio signals 201.

In some embodiments, the noise suppression module 312 can include a noise estimation module or can otherwise receive an estimated noise signal from another module. The estimated noise signal can be augmented to include the residual OAF audio signals indicated by the transformed reference signal 313. In some embodiments, the estimated noise signal can further be augmented with time-frequency components indicated by the second suppression stage 208. In other words, the estimated noise signal can be modified to include both the time-frequency components indicated from the transformed reference signal 313, having low frequency OAF audio signal components, as well as the time-frequency components indicated by the second suppression stage 208. Consequently, this estimated noise signal has a robust inclusion of a wide range, including low, medium, and high frequency components of the OAF audio signals. This estimated noise signal can be used in any noise reduction module and/or used to apply any noise reduction methods to reduce or eliminate the OAF audio signals. The third suppression stage 212 outputs a clean signal 314. The clean signal 314 is in the time-frequency domain and can be processed by an inverse short time Fourier transform (ISTFT) 316 to generate the output signal 214 in time domain. The output signal 214 can be transmitted to a far-end recipient of a video conferencing event.

Methods of Acoustic Fence Generation

Figure 5:
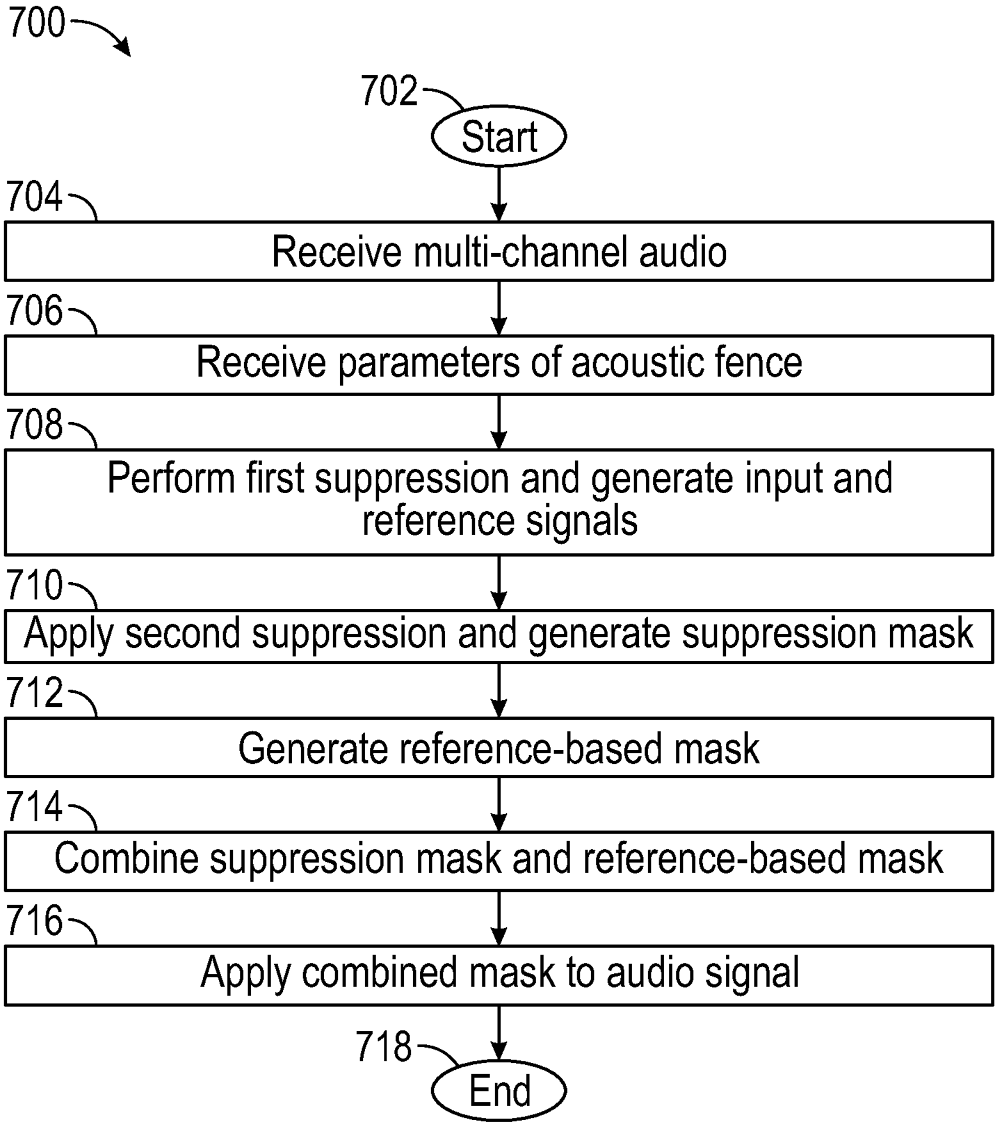
FIG. 5 illustrates an example method of operation of an acoustic fence generator.

FIG. 5 illustrates an example method 700 of operation of an acoustic fence generator, such as AFG 200 or AFG 300, according to an embodiment. The method starts at step 702. At step 704, a multi-channel audio signal is received from a multi-channel audio input device, such as the MCAI device 104. The audio input device or the MCAI device 104 can perform analog to digital conversion transforming an analog audio signal to a digital audio signal 201. At step 706, parameters of an acoustic fence 120 can be received. The parameters can be received in a variety of ways, including by input from a user (e.g., an IT personnel) via a UI element of the conference device application 106. The acoustic fence parameters can also include default values. In some embodiments, the AFG 200, 300 operations can be turned on or off using a UI element, such as a slider, radio button or other UI elements. The acoustic fence parameters can include the angles 114 and/or angle ranges and distances 116. At step 708, a first suppression stage 202 performs first suppression operations on the audio signals 201, generating an in-beam signal 204 and a reference signal 206. The in-beam signal 204 is generated by suppressing the OAF audio signals 201 based on the received acoustic fence parameters. The reference signal 206 performs the inverse operations of the in-beam beamformer and is generated by suppressing the IAF audio signals 201.

At step 710, a second suppression stage 208 performs second suppression operations on the audio signals 201, generating a suppression mask 210 based on the received acoustic fence parameters and detected angles and distances of the audio signals 201. When applied to the in-beam signal 204 generated at step 708, the suppression mask 210 further suppresses the OAF audio signals 201 At step 712, the third suppression stage 212 generates a reference-based mask, based on the reference signal 206, generated at step 708. The reference-based mask when applied to the in-beam signal 204 suppresses the low frequency components (usually below 1000 Hz) of the OAF audio signals. At step 714, the third suppression stage 212 can combine the suppression mask 210 and the reference-based mask generated at step 712. The combined mask when applied to the in-beam signal 204 generated at step 708, can suppress OAF audio signals of a wide range of frequencies, including low to medium and high frequencies. In some embodiments, the combined mask can also be based on an estimated noise signal in the input audio 201. A noise-based, reference-based mask can suppress both the noise and the OAF audio signals in the in-beam signal 204. At step 716, the third suppression stage 212 applies the combined mask to the in-beam signal 204 generated at step 708, generating the output signal 214. The output signal 214 can be transmitted to a far-end recipient of an online audio/video conference. The method ends at step 718.

Figure 6:
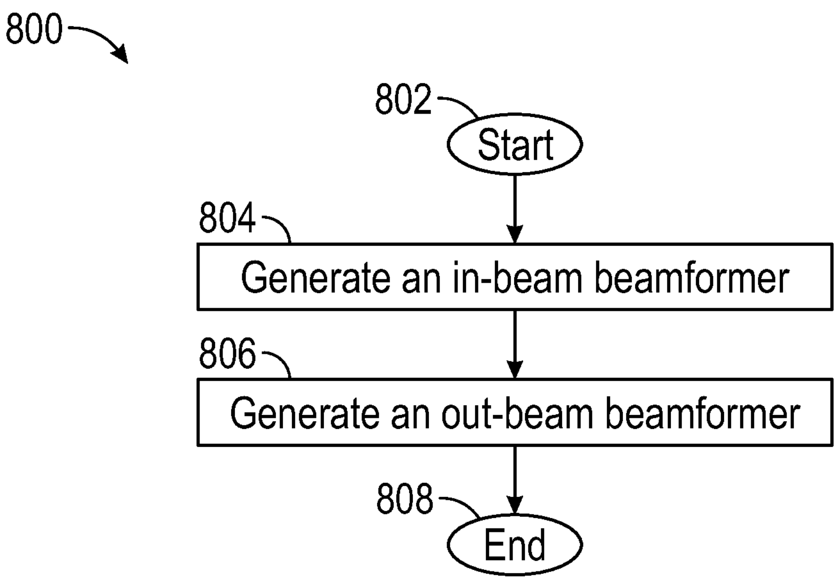
FIG. 6 illustrates an example method of operations of a first suppression stage.

FIG. 6 illustrates an example method 800 of the operations of the first suppression stage 202. The method starts at step 802. At step 804, the first suppression stage 202 can generate an in-beam beamformer 302 from the audio signals 201, based on the acoustic fence parameters. The in-beam beamformer 302 suppresses the OAF audio signals in the audio signals 201 and generates the in-beam signal 204. The in-beam signal 204 is the signal that is further processed downstream to further reduce or minimize the residual OAF audio signals and to be the basis for generating the output signal 214. At step 806, the first suppression stage 202 generates an out-beam beamformer 304, the out-beam beamformer 304 performs the inverse operation of the in-beam beamformer 302 and suppresses the IAF audio signals 201. The out-beam beamformer 304 generates the reference signal 206. The reference signal 206 is a full-band signal and contains the enhanced low frequency components of the OAF audio signals 201 and suppressed IAF audio signal. The reference signal 206 can be used in downstream operations to further suppress OAF audio signals. The method ends at step 808.

Figure 7:
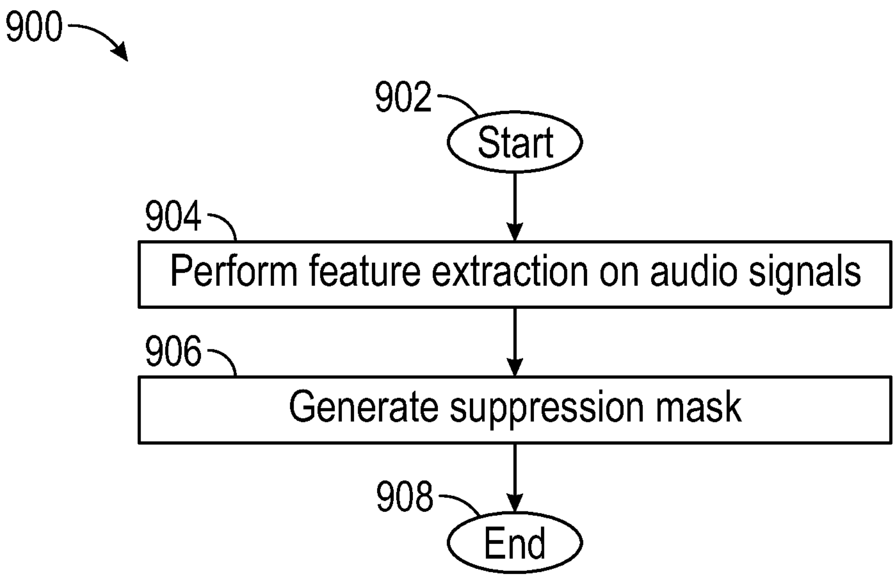
FIG. 7 illustrates an example method of operations of a second suppression stage.

FIG. 7 illustrates an example method 900 of the operations of the second suppression stage 208. The method starts at step 902. At step 904, the suppression stage 208 performs feature extraction on the audio signals. In some embodiments, the second suppression stage 208 operates on transformed audio signals 307. The transformed audio signals 307 are generated by transforming the discrete digital audio signals 201 to time-frequency domain, for example by processing the audio signals 201 through an STFT module 306. The feature extraction operations include detecting an angle 114 and/or distance 116 of the audio signals 201. At step 906, the second suppression stage 208 generates a suppression mask 210, based on the detected angles and/or distances and the acoustic fence parameters. The suppression mask 210 may be a data structure, such as a vector, or matrix of multipliers that when applied to the transformed in-beam signals 311, suppresses the OAF audio signals. In some embodiments, a post filter module 310 includes the thresholds corresponding to the acoustic fence parameters and can construct the suppression mask 210, by assigning a suppressing multiplier to the audio signals detected to be from an OAF region. The suppression mask 210 can include multipliers that enhance signals originating from the IAF region. The suppression mask 210 can be provided to the third suppression stage 212 to combine with other masks and apply to the transformed in-beam signal 311. The method ends at step 908.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 8:
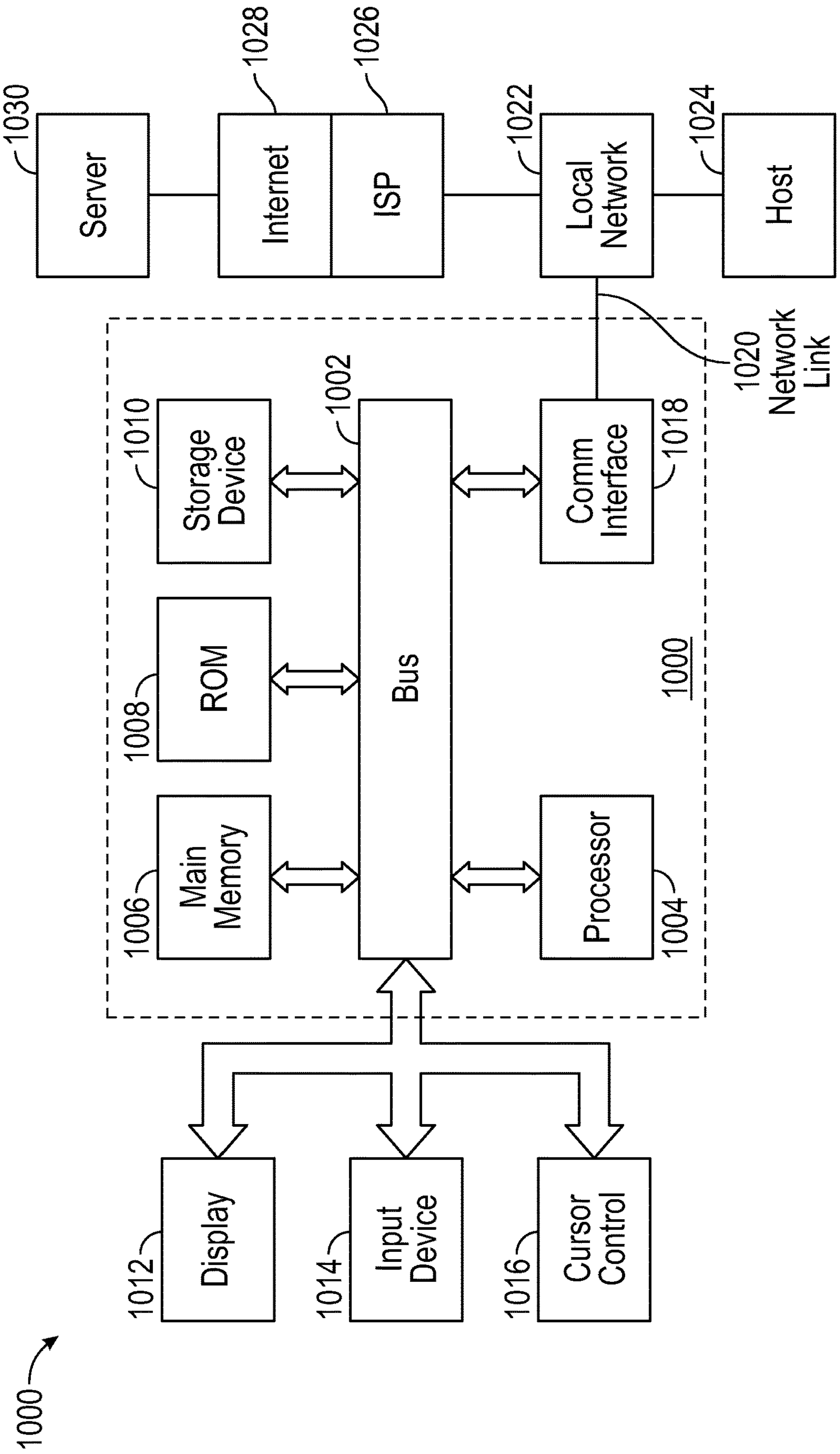
FIG. 8 is a block diagram that illustrates a computer system upon which one or more described embodiment can be implemented.

For example, FIG. 8 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples and their combinations.

Example 1: A method comprising: receiving a plurality of audio signals through a multi-channel audio input device; receiving parameters of an acoustic fence; comprising an angle and/or a distance for an acoustic fence; applying a first suppression to the audio signals comprising suppressing audio signals outside the acoustic fence to generate an in-beam signal and suppressing audio signals inside the acoustic fence to generate a reference signal; applying a second suppression to the audio signals, generating a suppression mask, wherein applying the suppression mask to the first suppression stage output signal further suppresses the audio signals outside the fence; and applying a third suppression, comprising applying a combined suppression mask and a reference-based mask, to the second suppression stage output signal, and generating a final output signal, wherein the reference-based mask suppresses residual low frequency components of audio signals outside the acoustic fence after processing by first and second suppression stages.

Example 2: The method of Example 1, wherein applying the first suppression to the audio signals comprises: generating an in-beam beamformer comprising audio signals outside the acoustic fence suppressed; generating an out-beam beamformer comprising the reference signal by suppressing audio signals inside the acoustic fence.

Example 3: The method of some or all of Examples 1 and 2, wherein applying the second suppression and generating the suppression mask comprises: performing feature extraction, wherein the features comprise angle and/or distance of a source of an audio signal relative to the multi-channel audio input device; and generating the suppression mask based on the received parameters of the acoustic fence.

Example 4: The method of some or all of Examples 1-3, wherein applying the third suppression comprises: receiving, by the third suppression stage, the suppression mask generated by the second suppression stage; generating, by the third suppression stage, the reference-based mask comprising multipliers to suppress low frequency residual components of signals outside the acoustic fence; and combining the suppression mask and the reference-based mask.

Example 5: The method of some or all of Examples 1-4, wherein the first suppression comprises two time-domain filter and sum beamformers, wherein the first suppression comprises generating in-beam and out-beam beamformers, wherein the in-beam and out-beam are inverse of one another.

Example 6: The method of some or all of Examples 1-5, wherein generating the suppression mask is based on determining an angle and/or distance of a source of an audio signal relative to the multi-channel audio input device.

Example 7: The method of some or all of Examples 1-6, wherein generating the suppression mask comprises: applying a direction of arrival (DOA) technique to determine an angle of a source of an audio signal relative to the multi-channel audio input device; and applying a generalized cross correlation with phase transform (GCC-PHAT) or Steered-Response Power Phase Transform (SRP-PHAT) based localization technique to determine the distance of a source of an audio signal relative to the multi-channel audio input device.

Example 8: A Non-transitory computer storage that stores executable program instructions that, when executed by one or more computing devices, configure the one or more computing devices to perform operations comprising: receiving a plurality of audio signals through a multi-channel audio input device; receiving parameters of an acoustic fence; comprising an angle and/or a distance for an acoustic fence; applying a first suppression to the audio signals comprising suppressing audio signals outside the acoustic fence to generate an in-beam signal and suppressing audio signals inside the acoustic fence to generate a reference signal; applying a second suppression to the audio signals, generating a suppression mask, wherein applying the suppression mask to the first suppression stage output signal further suppresses the audio signals outside the fence; and applying a third suppression, comprising applying a combined suppression mask and a reference-based mask, to the second suppression stage output signal, and generating a final output signal, wherein the reference-based mask suppresses residual low frequency components of audio signals outside the acoustic fence after processing by the first and second suppression stages.

Example 9: The non-transitory computer storage of Example 8, wherein applying the first suppression to the audio signals comprises: generating an in-beam beamformer comprising audio signals outside the acoustic fence suppressed; generating an out-beam beamformer comprising the reference signal by suppressing audio signals inside the acoustic fence.

Example 10: The non-transitory computer storage of some or all of Examples 8 and 9, wherein applying the second suppression and generating the suppression mask comprises: performing feature extraction, wherein the features comprise angle and/or distance of a source of an audio signal relative to the multi-channel audio input device; and generating the suppression mask based on the received parameters of the acoustic fence.

Example 11: The non-transitory computer storage of some or all of Examples 8-10, wherein applying the third suppression comprises: receiving, by the third suppression stage, the suppression mask generated by the second suppression stage; generating, by the third suppression stage, the reference-based mask comprising multipliers to suppress low frequency residual components of signals outside the acoustic fence; and combining the suppression mask and the reference-based mask.

Example 12: The non-transitory computer storage of some or all of Examples 8-11, wherein the first suppression comprises two time-domain filter and sum beamformers, wherein the first suppression comprises generating in-beam and out-beam beamformers, wherein the in-beam and out-beam are inverse of one another.

Example 13: The non-transitory computer storage of some or all of Examples 8-12, wherein generating the suppression mask is based on determining an angle and/or distance of a source of an audio signal relative to the multi-channel audio input device.

Example 14: The non-transitory computer storage of some or all of Examples 8-13, wherein generating the suppression mask comprises: applying a direction of arrival (DOA) technique to determine an angle of a source of an audio signal relative to the multi-channel audio input device; and applying a generalized cross correlation with phase transform (GCC-PHAT) or Steered-Response Power Phase Transform (SRP-PHAT) based localization technique to determine the distance of a source of an audio signal relative to the multi-channel audio input device.

Example 15: A system comprising one or more processors, the one or more processors configured to perform operations comprising: receiving a plurality of audio signals through a multi-channel audio input device; receiving parameters of an acoustic fence; comprising an angle and/or a distance for an acoustic fence; applying a first suppression to the audio signals comprising suppressing audio signals outside the acoustic fence to generate an in-beam signal and suppressing audio signals inside the acoustic fence to generate a reference signal; applying a second suppression to the audio signals, generating a suppression mask, wherein applying the suppression mask to the first suppression stage output signal further suppresses the audio signals outside the fence; and applying a third suppression, comprising applying a combined suppression mask and a reference-based mask, to the second suppression stage output signal, and generating a final output signal, wherein the reference-based mask suppresses low frequency residual components of audio signals outside the acoustic fence after processing by first and second suppression stages.

Example 16: The system of Example 15, wherein applying the first suppression to the audio signals comprises: generating an in-beam beamformer comprising audio signals outside the acoustic fence suppressed; generating an out-beam beamformer comprising the reference signal by suppressing audio signals inside the acoustic fence.

Example 17: The system of some or all of Examples 15 and 16, wherein applying the second suppression and generating the suppression mask comprises: performing feature extraction, wherein the features comprise angle and/or distance of an origin of an audio signal relative to the multi-channel audio input device; and generating the suppression mask based on the received parameters of the acoustic fence.

Example 18: The system of some or all of Examples 15-17, wherein applying the third suppression comprises: receiving, by the third suppression stage, the suppression mask generated by the second suppression stage; generating, by the third suppression stage, the reference-based mask comprising multipliers to suppress low frequency residual components of signals outside the acoustic fence; and combining the suppression mask and the reference-based mask.

Example 19: The system of some or all of Examples 15-18, wherein the first suppression comprises two time-domain, filter and sum beamformers, wherein the first suppression comprises generating in-beam and out-beam beamformers, wherein the in-beam and out-beam are inverse of one another.

Example 20: The system of some or all of Examples 15-19, wherein generating the suppression mask is based on determining an angle and/or distance of a source of an audio signal relative to the multi-channel audio input device Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:

receiving a plurality of audio signals through a multi-channel audio input device;

receiving parameters of an acoustic fence, the parameters comprising an angle or a distance for the acoustic fence;

applying a first suppression stage to the audio signals to generate a first suppression stage output, applying the first suppression stage comprising suppressing audio signals outside the acoustic fence to generate an in-beam signal and suppressing audio signals inside the acoustic fence to generate a reference signal;

applying a second suppression stage to the first suppression stage output to generate a second suppression stage output signal, applying the second suppression stage comprising generating a suppression mask, the suppression mask configured to suppress the audio signals outside the acoustic fence; and applying a third suppression stage comprising applying a combined suppression mask and a reference-based mask to the second suppression stage output signal, and generating a final output signal, wherein the reference-based mask suppresses residual low frequency components of audio signals outside the acoustic fence after processing by first and second suppression stages.

2. The method of claim 1, wherein applying the first suppression to the audio signals comprises:

generating an in-beam beamformer comprising audio signals outside the acoustic fence suppressed; and generating an out-beam beamformer comprising the reference signal by suppressing audio signals inside the acoustic fence.

3. The method of claim 1, wherein applying the second suppression and generating the suppression mask comprises:

performing feature extraction, wherein the features comprise angle and/or distance of a source of an audio signal relative to the multi-channel audio input device; and generating the suppression mask based on the received parameters of the acoustic fence.

4. The method of claim 1, wherein applying the third suppression comprises:

receiving, by the third suppression stage, the suppression mask generated by the second suppression stage;

generating, by the third suppression stage, the reference-based mask comprising multipliers to suppress low frequency residual components of signals outside the acoustic fence; and combining the suppression mask and the reference-based mask.

5. The method of claim 1, wherein the first suppression comprises two time-domain filter and sum beamformers, wherein the first suppression comprises generating in-beam and out-beam beamformers, wherein the in-beam and out-beam are inverse of one another.

6. The method of claim 1, wherein generating the suppression mask is based on determining an angle and/or distance of a source of an audio signal relative to the multi-channel audio input device.

7. The method of claim 1, wherein generating the suppression mask comprises:

applying a direction of arrival (DOA) technique to determine an angle of a source of an audio signal relative to the multi-channel audio input device; and applying a generalized cross correlation with phase transform (GCC-PHAT) or Steered-Response Power Phase Transform (SRP-PHAT) based localization technique to determine the distance of a source of an audio signal relative to the multi-channel audio input device.

8. A non-transitory computer storage medium comprising processor-executable program instructions configured to cause one or more processors to:

receive a plurality of audio signals through a multi-channel audio input device;

receive parameters of an acoustic fence, the parameters comprising an angle or a distance for the acoustic fence;

apply a first suppression stage to the audio signals to generate a first suppression stage output, applying the first suppression stage comprising suppressing audio signals outside the acoustic fence to generate an in-beam signal and suppressing audio signals inside the acoustic fence to generate a reference signal;

apply a second suppression stage to the first suppression stage output to generate a second suppression stage output signal, applying the second suppression stage comprising generating a suppression mask, the suppression mask configured to suppress the audio signals outside the acoustic fence; and apply a third suppression stage comprising applying a combined suppression mask and a reference-based mask to the second suppression stage output signal, and generate a final output signal, wherein the reference-based mask suppresses residual low frequency components of audio signals outside the acoustic fence after processing by first and second suppression stages.

9. The non-transitory computer storage of claim 8, further comprising processor-executable program instructions configured to cause the one or more processors to:

generate an in-beam beamformer comprising audio signals outside the acoustic fence suppressed; and generate an out-beam beamformer comprising the reference signal by suppressing audio signals inside the acoustic fence.

10. The non-transitory computer storage of claim 8, wherein applying the second suppression and generating the suppression mask comprises:

perform feature extraction, wherein the features comprise angle and distance of a source of an audio signal relative to the multi-channel audio input device; and generate the suppression mask based on the received parameters of the acoustic fence.

11. The non-transitory computer storage of claim 8, further comprising processor-executable program instructions configured to cause the one or more processors to:

receive, by the third suppression stage, the suppression mask generated by the second suppression stage;

generate, by the third suppression stage, the reference-based mask comprising multipliers to suppress low frequency residual components of signals outside the acoustic fence; and combine the suppression mask and the reference-based mask.

12. The non-transitory computer storage of claim 8, wherein the first suppression comprises two time-domain filter and sum beamformers, wherein the first suppression comprises generating in-beam and out-beam beamformers, wherein the in-beam and out-beam are inverse of one another.

13. The non-transitory computer storage of claim 8, wherein generating the suppression mask is based on determining an angle and distance of a source of an audio signal relative to the multi-channel audio input device.

14. The non-transitory computer storage of claim 8, further comprising processor-executable program instructions configured to cause the one or more processors to:

apply a direction of arrival (DOA) technique to determine an angle of a source of an audio signal relative to the multi-channel audio input device; and apply a generalized cross correlation with phase transform (GCC-PHAT) or Steered-Response Power Phase Transform (SRP-PHAT) based localization technique to determine the distance of a source of an audio signal relative to the multi-channel audio input device.

15. A system comprising:

a non-transitory computer-readable medium; and one or more processors communicatively coupled to the non-transitory computer-readable medium, the one or more processors configured to execute processor-executable program instructions stored in the non-transitory computer-readable medium to:

receive a plurality of audio signals through a multi-channel audio input device;

receive parameters of an acoustic fence, the parameters comprising an angle or a distance for the acoustic fence;

apply a first suppression stage to the audio signals to generate a first suppression stage output, applying the first suppression stage comprising suppressing audio signals outside the acoustic fence to generate an in-beam signal and suppressing audio signals inside the acoustic fence to generate a reference signal;

apply a second suppression stage to the first suppression stage output to generate a second suppression stage output signal, applying the second suppression stage comprising generating a suppression mask, the suppression mask configured to the suppress the audio signals outside the acoustic fence; and apply a third suppression stage comprising applying a combined suppression mask and a reference-based mask to the second suppression stage output signal, and generate a final output signal, wherein the reference-based mask suppresses residual low frequency components of audio signals outside the acoustic fence after processing by first and second suppression stages.

16. The system of claim 15, wherein the one or more processors are configured to execute further processor-executable program instructions stored in the non-transitory computer-readable medium to:

generate an in-beam beamformer comprising audio signals outside the acoustic fence suppressed; and generate an out-beam beamformer comprising the reference signal by suppressing audio signals inside the acoustic fence.

17. The system of claim 15, wherein the one or more processors are configured to execute further processor-executable program instructions stored in the non-transitory computer-readable medium to:

perform feature extraction, wherein the features comprise angle and/or distance of a source of an audio signal relative to the multi-channel audio input device; and generate the suppression mask based on the received parameters of the acoustic fence.

18. The system of claim 15, wherein the one or more processors are configured to execute further processor-executable program instructions stored in the non-transitory computer-readable medium to:

receive, by the third suppression stage, the suppression mask generated by the second suppression stage;

generate, by the third suppression stage, the reference-based mask comprising multipliers to suppress low frequency residual components of signals outside the acoustic fence; and combine the suppression mask and the reference-based mask.

19. The system of claim 15, wherein the first suppression comprises two time-domain filter and sum beamformers, wherein the first suppression comprises generating in-beam and out-beam beamformers, wherein the in-beam and out-beam are inverse of one another.

20. The system of claim 15, wherein generating the suppression mask is based on determining an angle and/or distance of a source of an audio signal relative to the multi-channel audio input device.

* * * * *